(12) United States Patent
Kovalsky et al.

(10) Patent No.: US 7,165,945 B2
(45) Date of Patent: *Jan. 23, 2007

(54) BRAIDED SPAR FOR A ROTOR BLADE AND METHOD OF MANUFACTURE THEREOF

(75) Inventors: David A. Kovalsky, Shelton, CT (US); Kevin Viola, Wallingford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 179 days.

This patent is subject to a terminal disclaimer.

(21) Appl. No.: 10/646,310

(22) Filed: Aug. 22, 2003

(65) Prior Publication Data

US 2005/0042109 A1 Feb. 24, 2005

(51) Int. Cl.
*B64C 11/26* (2006.01)

(52) U.S. Cl. ............... 416/226; 416/228; 416/230; 416/237; 416/241 A

(58) Field of Classification Search ............ 416/134 A, 416/141, 226, 230, 241 A, 228, 229 R, 237; 87/1, 5, 8, 11, 23, 28, 34, 9; 428/36.3, 107, 428/111, 113; 442/204–207
See application file for complete search history.

(56) References Cited

U.S. PATENT DOCUMENTS

| 4,567,917 A | | 2/1986 | Millard |
| 4,741,087 A | * | 5/1988 | Plummer, Jr. ............. 87/7 |
| 5,087,187 A | | 2/1992 | Simkulak et al. |
| 5,222,297 A | * | 6/1993 | Graff et al. .......... 29/889.71 |
| 5,485,774 A | | 1/1996 | Osborne |
| 5,570,631 A | | 11/1996 | Leahy et al. |
| 5,571,357 A | | 11/1996 | Darrieux et al. |
| 5,700,533 A | * | 12/1997 | You .................. 428/36.3 |
| 5,755,558 A | | 5/1998 | Reinfelder et al. |
| 5,836,062 A | | 11/1998 | Leahy et al. |
| 5,939,007 A | | 8/1999 | Iszczyszyn et al. |
| 6,263,936 B1 | | 7/2001 | Moore et al. |
| 6,358,186 B1 | | 3/2002 | Kosik et al. |
| RE37,673 E | | 4/2002 | Leahy et al. |
| 6,447,254 B1 | * | 9/2002 | Holowczak et al. ...... 416/224 |
| 2002/0008177 A1 | * | 1/2002 | Violette .................. 416/226 |

* cited by examiner

*Primary Examiner*—Christopher Verdier
(74) *Attorney, Agent, or Firm*—Carlson, Gaskey & Olds

(57) ABSTRACT

A braided rotor blade spar includes a tri-axle braid in which braided bias angled fibers are located non-parallel to a longitudinal axis of the spar. Zero degree fibers are located parallel to the axis and are positioned to be on the upper and lower surfaces of the spar. The bias angle fibers are braided around the zero degree fibers. In a method of manufacture of the braided spar, a braided sleeve is formed dry over a mandrel by a multi-axial braiding machine. Once the braided sleeve is formed upon the mandrel, the mandrel is located within a matched metal mold, resin impregnated, and cured. The mandrel is then removed from the finished braided spar.

28 Claims, 7 Drawing Sheets

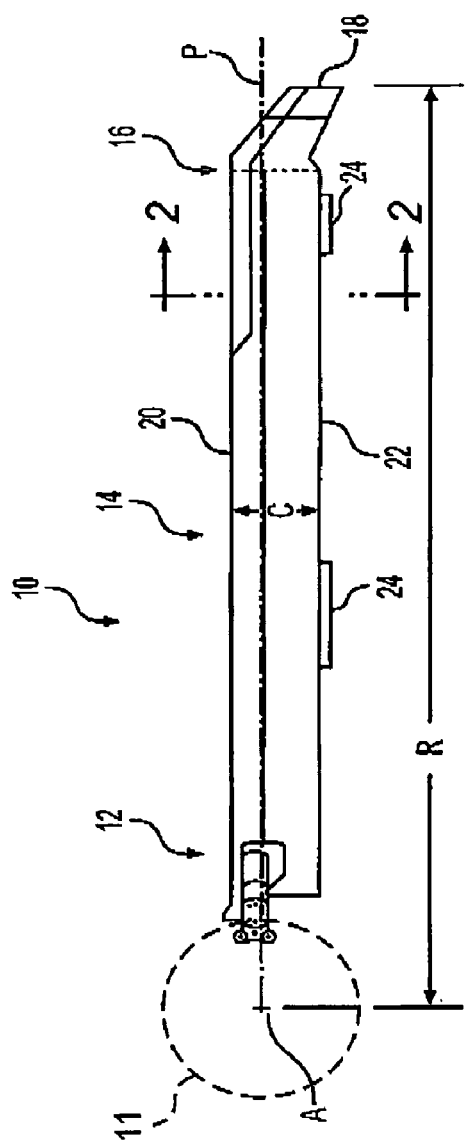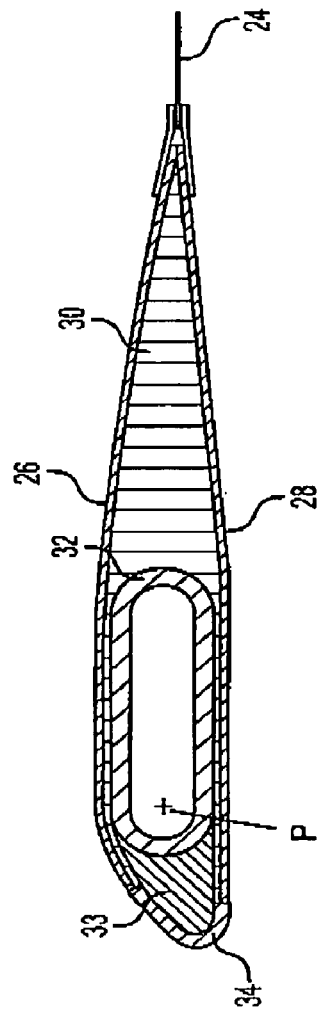
FIG. 1
FIG. 2

BRAIDED SPAR FOR A ROTOR BLADE AND METHOD OF MANUFACTURE THEREOF

BACKGROUND OF THE INVENTION

The present invention relates to a hollow composite member, and more particularly to a composite spar which utilizes braided fibers at specific angle orientation and a method for facilitating the manufacture thereof.

A rotor blade spar is a primary structural element of a helicopter rotor blade assembly inasmuch as its primary function is to transfer combined flapwise, edgewise, torsional and centrifugal loads to/from a central torque drive hub member. Typically, a leading edge and trailing edge assembly envelop the spar to yield a desired airfoil contour. The spar typically extends along the length of the rotor blade and mounts at its inboard end to a cuff assembly that facilitates mounting to the hub member.

Fiber reinforced resin matrix composite materials are employed due to their advantageous strength to weight ratio. Despite the inherent weight and strength advantages, widespread use thereof has been impeded by the high cost of materials and associated fabrication methods.

Conventional methods for manufacturing composite spars include filament winding and prepreg lay-up of composite material. Although effective, these processes are relatively time and labor intensive.

The prepreg lay-up process is primarily performed by hand. Prepregs have little structural rigidity in their uncured state. The prepregs are hand-stacked and interleaved upon an inflatable mandrel assembly. The lay-up is then transferred into a matched metal mold and autoclave oven cured while the mandrel assembly is inflated to form the finished composite spar. Moreover, prepreg sheets are relatively expensive and require meticulous storage and handling processes which further increase manufacturing expense.

The filament winding process involves a winding process in which the filaments are preimpregnated or the resin is applied while the filaments are wound about a mandrel assembly. The mandrel assembly is of a shape generally corresponding to the required shape of the finished article. The mandrel assembly typically includes a rigid substructure and a bladder disposed over the rigid substructure. The filaments are wound over the mandrel while the mandrel and filaments are reciprocally displaced relative to one another along the longitudinal or winding axis of the mandrel to build a plurality of layers of filamentary material. Upon completion of the filament winding process, the mandrel-wound lay-up is placed in a matched metal mold and cured while the bladder is pressurized to urge the fibers against the matched metal mold.

One disadvantage to filament winding relates to difficulties associated with expanding the fibers against the matched metal mold. As the fibers are initially wound laterally about the mandrel under tension, pressurization sufficient to achieve proper laminate compaction is difficult to achieve. Should the fibers resist complete and uniform compaction, the composite article may become resin-rich or resin-starved in particular areas resulting in poor laminate quality. In the case of an elliptically shaped composite article, the conic regions, i.e., the leading and trailing edges, may be vulnerable to unacceptable variations in fiber volume.

Another disadvantage to conventional filament winding relates to the difficulty associated with establishing fiber orientations at or near 0 degrees relative to the longitudinal axis of the mandrel assembly. Insofar as conventional filament winding apparatus are deficient in this regard, it is common to periodically interrupt the winding operation to interleave unidirectional i.e., 0.degree fibers. Such interleaving operations are laboriously performed by hand and are relatively time consuming which still further increases manufacturing expense.

Accordingly, it is desirable to provide a structurally efficient composite spar which locates fibers in a particular orientation, minimizes weight, and increases damage tolerance. Furthermore, it is desirable to provide an inexpensive manufacturing process which reduces labor intensive process steps, permits ease of material handling, yet maintains exacting quality standards during assembly.

SUMMARY OF THE INVENTION

The rotor blade spar according to the present invention includes a multiple of individual fibers braided together to form a braided sleeve of composite materials. The braided sleeve is a tri-axle braid in which braided bias angled fibers are located at an angle relative the longitudinal axis of the spar. Zero degree fibers are located parallel to the axis and are positioned to be on the upper and lower surfaces of the spar. The braided bias angled fibers are braided around the zero degree fibers. The zero degree fibers are interwoven during the braiding cycle which increases the ballistic tolerance of the spar as delamination is minimized through interaction of the braided geometry. The braided sleeve defines a race-track shaped elongated cross-sectional profile, an elliptical-shaped elongated cross-sectional profile, or an airfoil-shaped elongated cross-sectional profile.

In a method of manufacture of the braided spar, the braided sleeve is formed dry by a multi-axial braiding machine. The multi-axial braiding machine includes a multiple of spools arranged about an outer ring which rotates about an axis of rotation. Rotation of the outer ring relative the inner ring braids a multiple of individual fibers from the multiple of spools to form the braided sleeve over a mandrel which is passed through the inner ring. Once the braided sleeve is formed upon the mandrel, the mandrel is located within a matched metal mold and resin impregnated. As the braided sleeve is formed with dry filaments, the braiding cycle need not be related to impregnating resin processing. Material storage and handling is reduced in complication which reduces labor intensive process steps and expense. Once the impregnating resin has cured such as through application of thermal energy, the cured braided sleeve and mandrel are removed from the matched metal mold and the mandrel is removed from the finished braided spar.

The present invention therefore provides a structurally efficient composite spar which locates the fibers in a particular orientation, minimizes weight, and increases damage tolerance. Furthermore, the present invention provides an inexpensive manufacturing process which reduces labor intensive process steps, permits ease of material handling, yet maintains exacting quality standards during assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a top plan view of an exemplary main rotor blade assembly;

FIG. 2 is a cross-sectional view of the main rotor blade of FIG. 1 taken along line 2—2 thereof;

DETAILED DESCRIPTION OF THE PREFERRED EMBODIMENT

Figure 3:
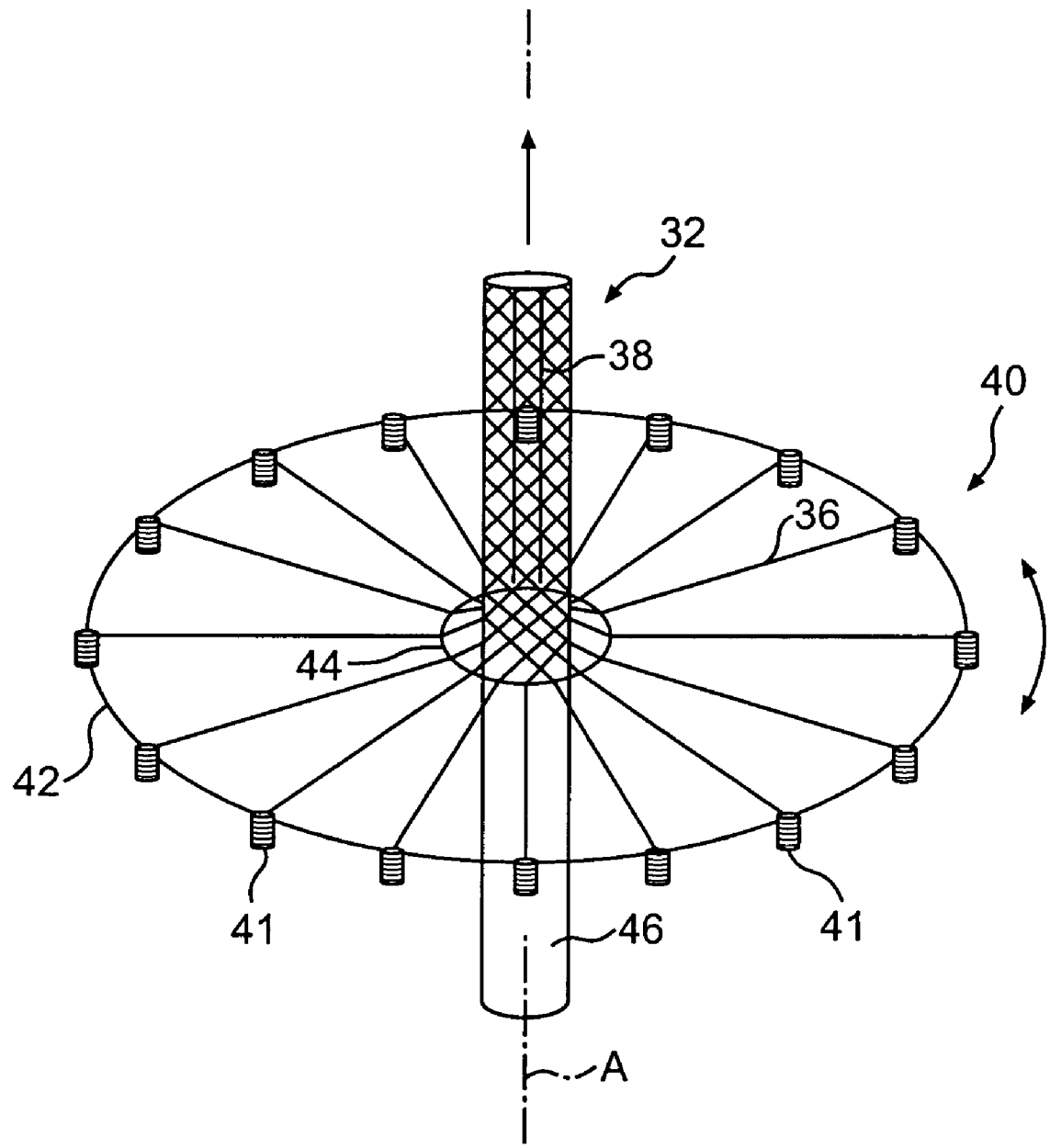
FIG. 3 is a schematic view of a multi-axial braiding machine for use with the present invention.

FIG. 1 schematically illustrates an exemplary main rotor blade assembly 10 mounted to a rotor hub assembly 11 (illustrated schematically) for rotation about an axis of rotation A. The main rotor blade 10 includes an inboard section 12, an intermediate section 14, and an outboard section 16. The inboard, intermediate, and outboard sections 12, 14, 16 define the span of the main rotor blade 10. The blade sections 12, 14, 16 define a blade radius R between the axis of rotation A and a blade tip 18.

A plurality of main rotor blade assemblies 10 project substantially radially outward from the hub assembly 11 and are supported therefrom in one of numerous attachments. Any number of blades 10 may be used with the rotor system 10. It should be understood that although a rotor system is illustrated in the disclosed embodiment, other applications which will benefit from a hollow composite member such as flex beams, main rotors, tail rotors, propellers, wing spars, turbines, windmills and the like will also benefit from the present invention.

The main rotor blade 10 has a leading edge 20 and a trailing edge 22, which define the chord C of the main rotor blade 10. Adjustable trim tabs 24 extend rearwardly from the trailing edge 22. A pitching or faying axis P is the center of mass of the rotor blade in the chord wise direction and is also the axis about which blade 10 twist occurs. The airfoil surface of the rotor blade 10 is typically twisted linearly along the blade span to improve aerodynamic efficiency. Although 10 to 12 degrees is common other twists will benefit from the present invention.

Referring to FIG. 2, upper and lower skins 26, 28 define the upper and lower aerodynamic surfaces of the main rotor blade 10. It should be understood that relative positional terms such as "forward," "aft," "upper," "lower," "above," "below," and the like are with reference to the normal operational attitude of the vehicle and should not be considered otherwise limiting. The skins 26, 28 are preferably formed from several plies of prepreg composite material such as woven fiberglass material embedded in a suitable resin matrix. A core 30, a spar 32, one or more counterweights 33, and a leading-edge sheath 34 form the interior support for the skins 26, 28 of the main rotor blade 10.

The spar 32 functions as the primary structural member of the main rotor blade 10, reacting the torsional, bending, shear, and centrifugal dynamic loads developed in the rotor blade 10 during operation. The spar 32 of the present invention is preferably manufactured from a braid of composite materials such as IM7, AS4, aramid, carbon, graphite, fiberglass, Kevlar and/or other fibrous materials. Preferably, 12000 or 6000 strength strands are utilized, however, other fibers will also benefit from the present invention.

Referring to FIG. 3, the spar 32 is formed by braiding a multiple of individual fibers 36 together to form a braided sleeve 38 of composite materials. The braided sleeve 38 provides a sock-like braid of fibers 36. It should be understood that the individual fibers 36 may themselves include a multiple of braided filaments or the like. The braided sleeve 38 is formed dry by a multi-axial braiding machine 40 (also illustrated in FIG. 4). The multi-axial braiding machine 40 includes a multiple of spools 41 arranged about an outer ring 42 which rotates about an axis of rotation A. Preferably, the multi-axial braiding machine 40 includes 144, 288 or other number of spools 41 supported upon the outer ring 42. Each spool 41 supports one fiber 36 which is communicated to a fixed inner ring 44. It should be understood that each spool 41 may support similar or dissimilar fibers 36 depending upon the desired construction of the spar 32.

Rotation of the outer ring 42 relative the inner ring 44 braids the multiple of individual fibers 36 to form the braided sleeve 38. Braiding machines are typically known and are often utilized in textile manufacturing with low strength fibers to form generally tubular garments. Braiding of filaments and the teaching provided herein is well within the skill of one of ordinary skill in the art of textile manufacture.

Figure 4:
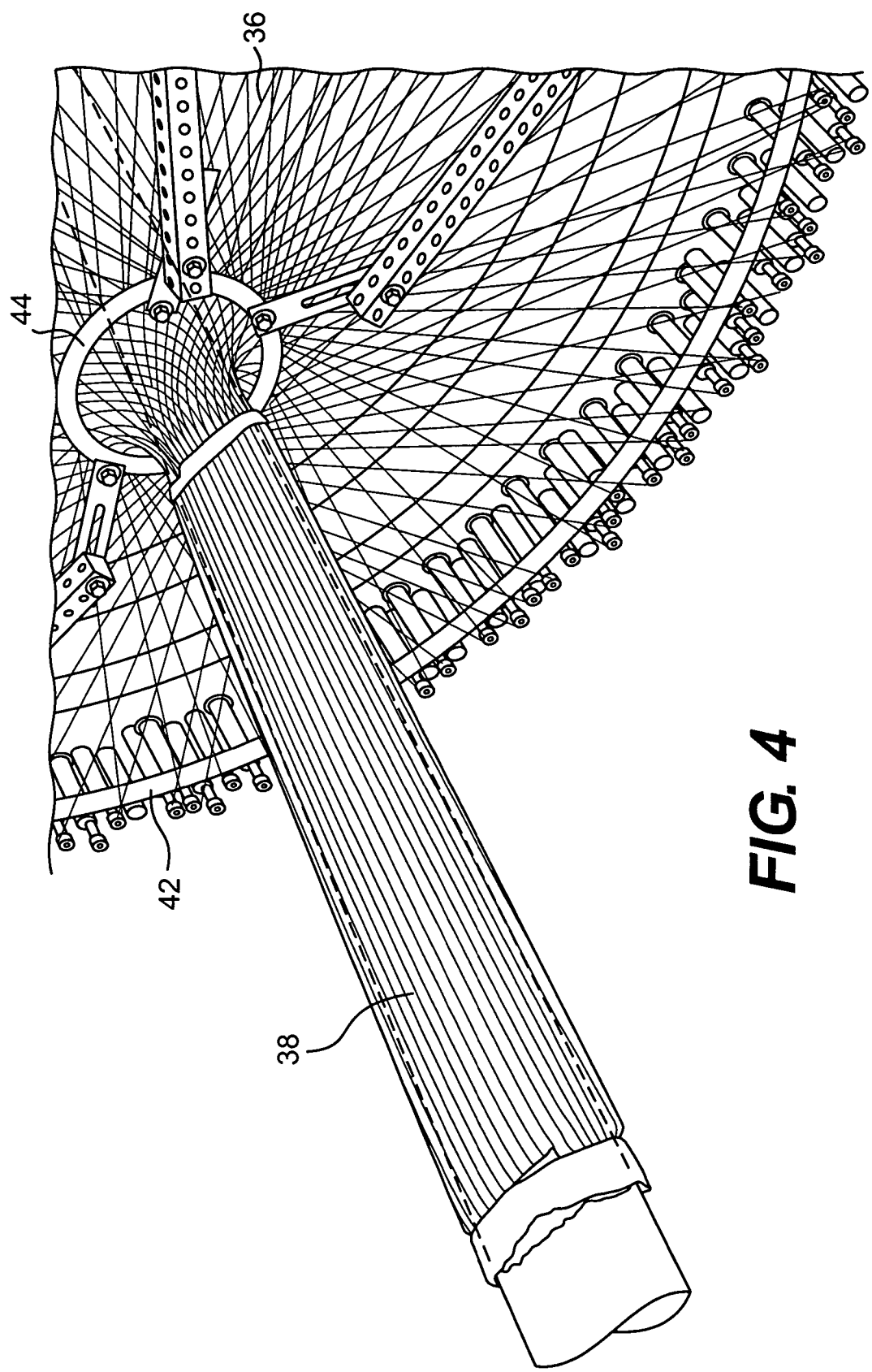
FIG. 4 is a perspective view of a braiding step in which a multiple of individual fibers are braided to form a braided sleeve over a mandrel being passed through the multi-axial braiding machine to form an exemplary rotor blade spar.
Figure 5:
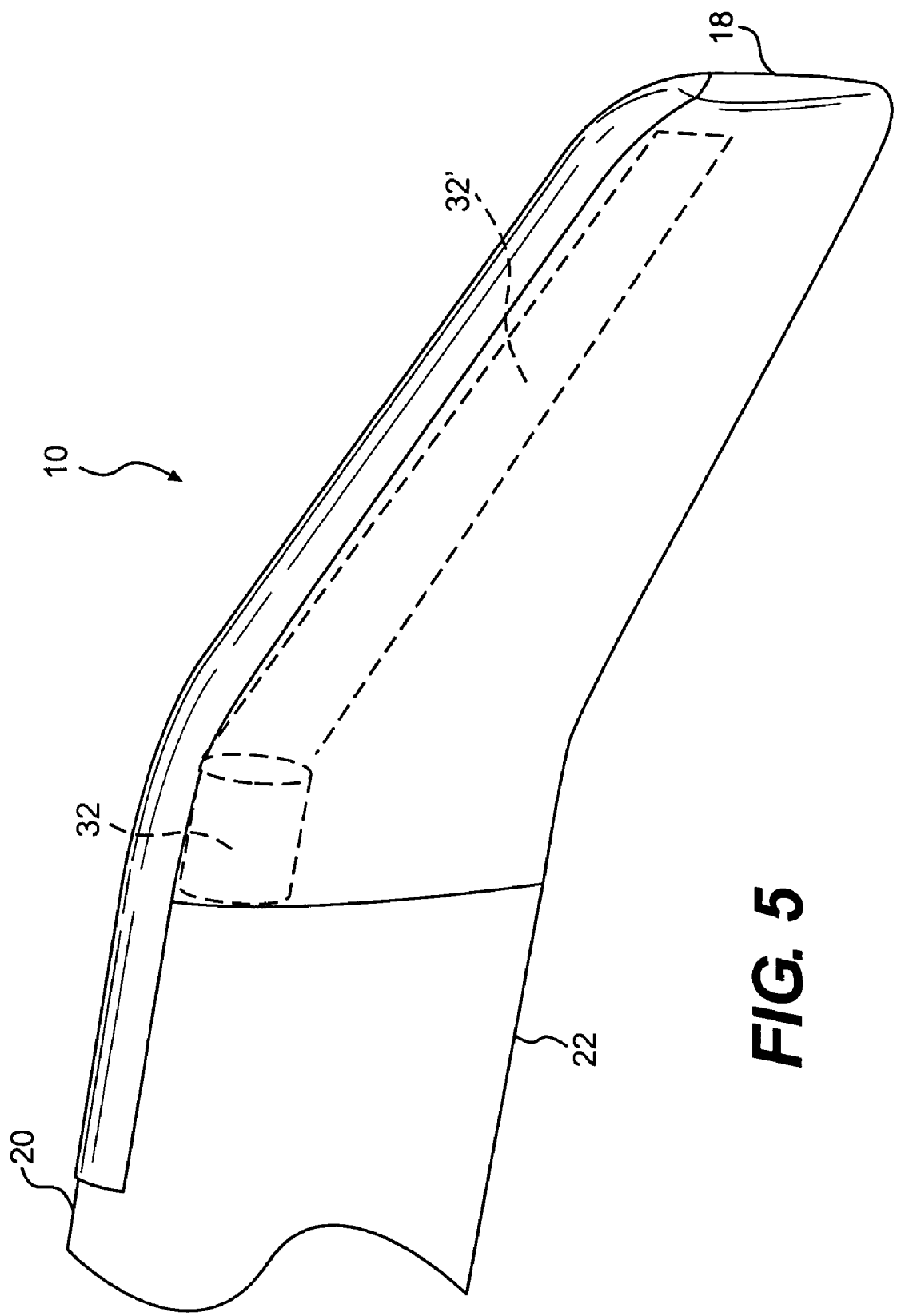
FIG. 5 is a perspective view of another exemplary spar for a rotor blade tip.

As the outer ring 42 rotates relative the inner ring 44 to braid the multiple of individual fibers 36 over a mandrel 46 which is passed through the inner ring 44 to receive and support the braided sleeve 38 (FIG. 4). That is, the mandrel 46 receives the braided sleeve 38 and forms the inner shape of the spar 32. Preferably, the braided sleeve 38 is formed to generally constrict if not otherwise supported by the mandrel 46. The braided sleeve 38 closely fits upon the mandrel 46 in a manner in which a sock closely fits over a foot. The mandrel 46 may be of a one-piece, multi-piece, and/or dissolvable construction depending upon the shape of the spar 32. It should be understood that the spar 32 need not be linear and that an angled spar 32 such as for a swept rotor tip (FIG. 5) will likewise benefit from the present invention.

Figure 6:
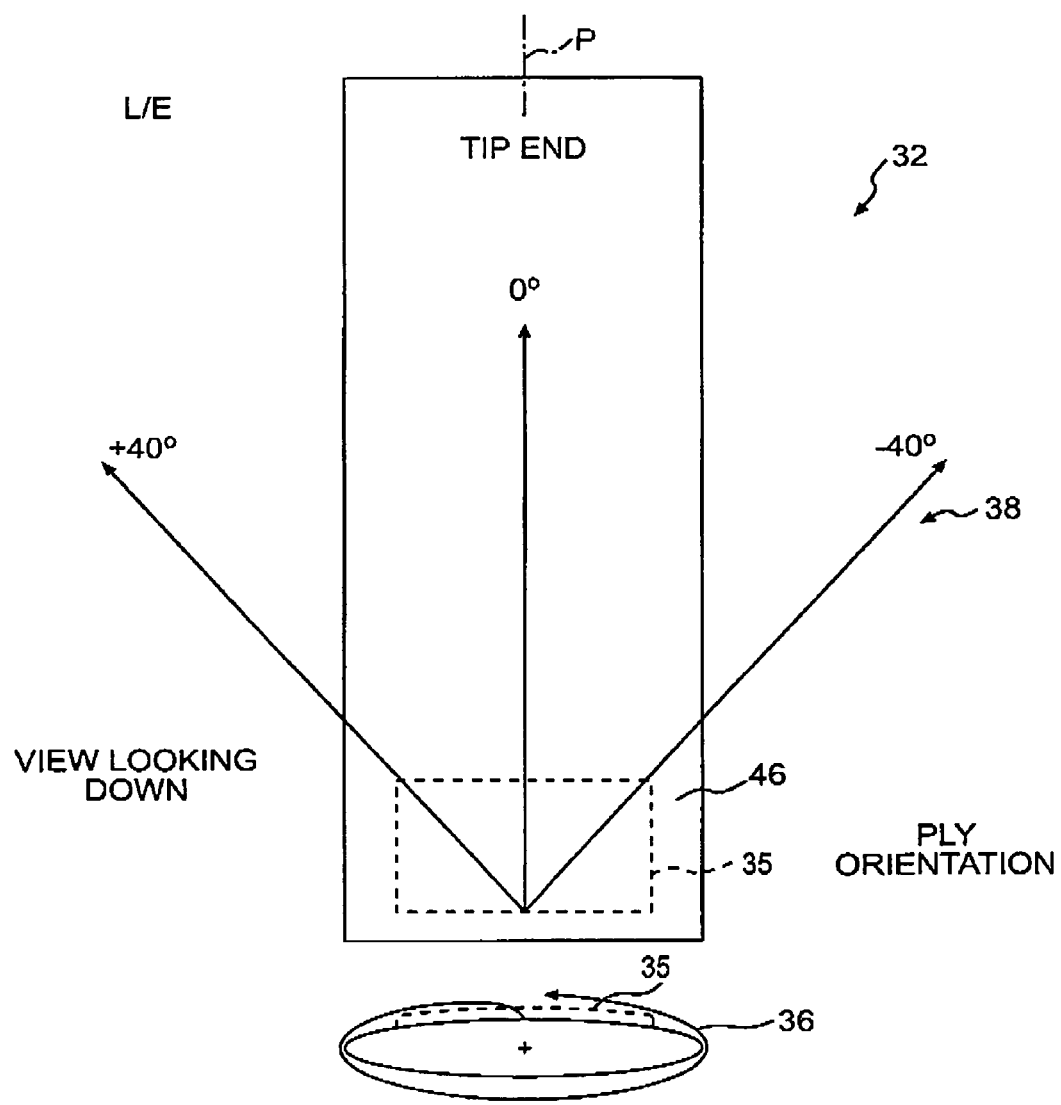
FIG. 6 is a schematic representation of a filament orientation in a rotor blade spar manufactured according to the present invention.

Referring to FIG. 6, the braided sleeve 38 is preferably a tri-axial braid. Bias angle fibers are preferably located at a 40 degree angle from the center line or the spar (faying axis P) and are distributed around the girth of the mandrel 46. The bias angle fibers provides torsional strength to the spar 32 and provides two axes of the tri-axial braid. The third axis of the tri-axle braid includes zero degree fibers which provide axial strength to the spar 32. Zero degree fibers are located parallel to the axis P. The zero degree fibers are positioned to be on the upper and lower surfaces of the spar 32 and the 40 degree fibers are braided around the zero degree fibers. That is, tracking an individual 40 degree fiber would follow a spiral path around the mandrel 36 such that the spiral path would be at a 40 degree angle to the faying axis P of the spar 32. The leading and trailing edge conics of the spar 32 include bias angle fibers at preferably 40 to 45 degrees to the axis P of the spar 32. It should be understood that other fiber orientations and fiber arrangements will benefit from the present invention. Moreover, the spar 32 preferably includes a multiple of braided layers to provide a desired laminate thickness and physical properties.

Additional local reinforcement of the spar 32 is accomplished by separate composite layers (illustrated schematically at 35) at desired locations. That is, dry composite material sheets may additionally be located at desired locations within the fibers during the braiding cycle.

The zero degree fibers are preferably interwoven during the braiding cycle and are located in a fixed position relative to the axis of rotation A of the multi-axial braiding machine 40 and are maintained in tension to reduce any strength reduction which may otherwise occur through bending of the fibers 36. Interweaving of the zero degree fibers increases the ballistic tolerance of the spar 32 as delamination is minimized through interaction of the braided geometry. Regarding the latter, the structural fibers of composite materials can be viewed as a plurality of redundant load paths wherein damage to one or more fibers can be mitigated by the load carrying capability of adjacent fibers.

Alternatively or additionally, the mandrel 46 may be rotated during braiding to follow a twist in the spar 32. That is, a rotor spar is often twisted 10 to 12 degrees linearly along the span to improve aerodynamic efficiency and the braided sleeve 38 which becomes the spar 32 once resin impregnated can be specifically oriented to accommodate such a twist.

Figure 7:
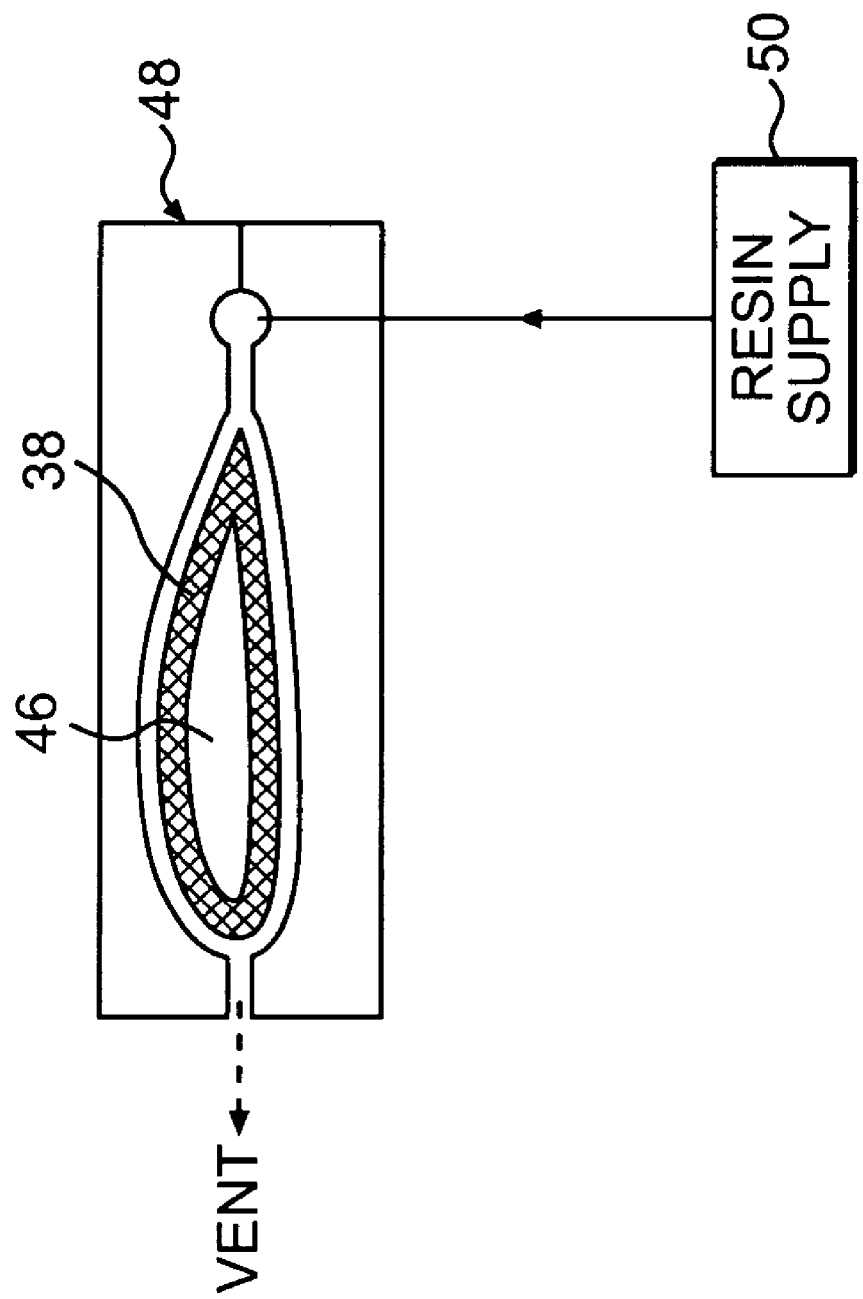
FIG. 7 is a schematic representation of a resin infusion step according to the present invention.

Referring to FIG. 7, once the braided sleeve 38 is formed upon the mandrel 46, the mandrel 46 is located within a matched metal mold 48. As the braided sleeve 38 is formed with dry filaments, the braiding cycle need not be related to impregnating resin processing such that material storage handling is reduced in complication which reduces labor intensive process steps and expense. Impregnating resin is preferably communicated into the matched metal mold 48 from a supply 50 and is pumped along a span of the metal mold 48 from a trailing edge of the matched metal mold 48 toward vents in a leading edge matched metal mold 48 to provide efficient manufacturing times. Other distribution schemes will also benefit from the present invention. The impregnating resin preferably includes a reactive resin component, curing agents, solvents and other agents. Typical resins include epoxy, epoxy novolacs and other thermosetting resins including polyesters, polyamides (both condensation and addition types), phenolic resins and bismaleimides. The resin may contain a thermoplastic or elastomeric agent to increase fracture resistance.

Figure 8:
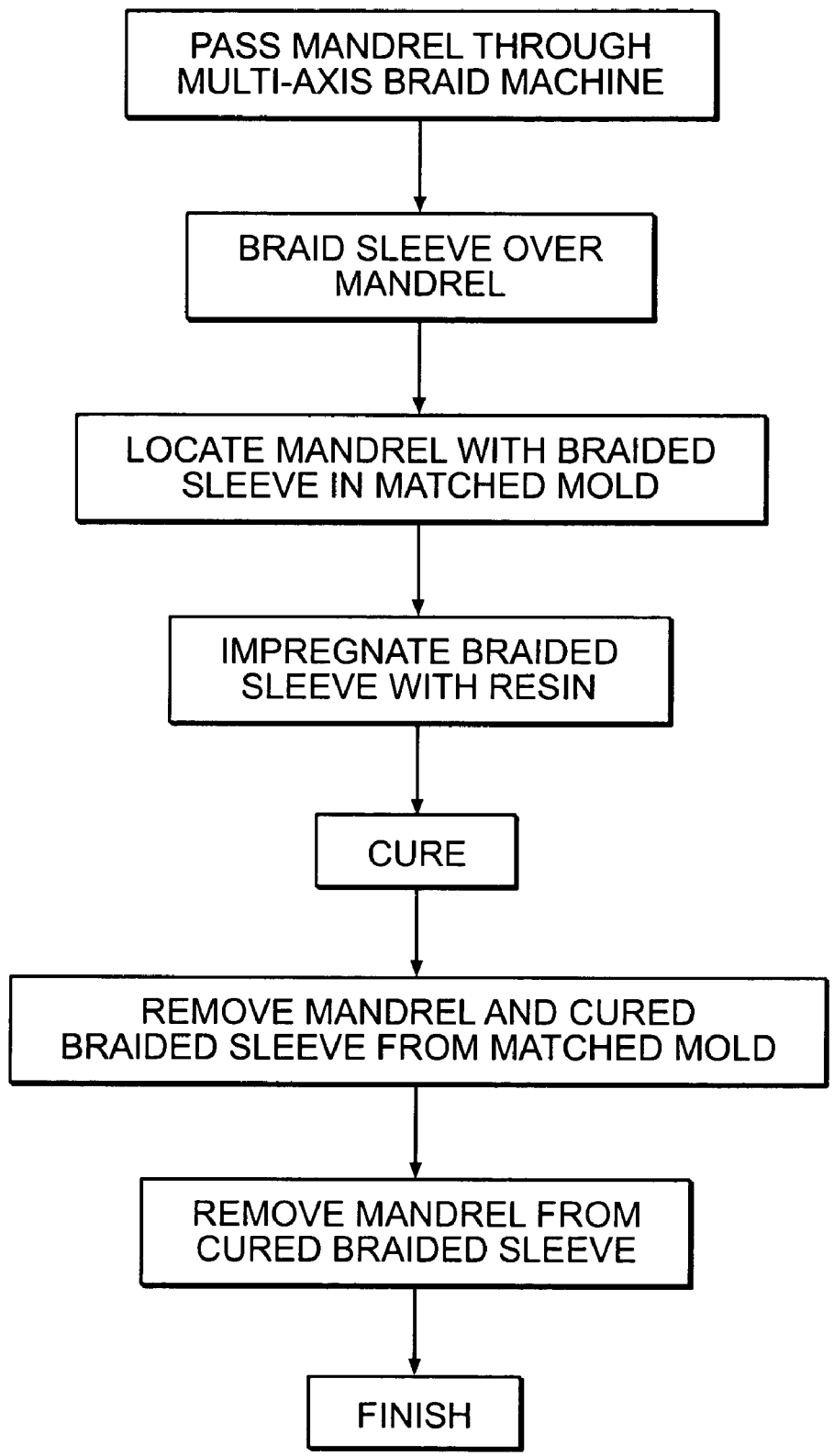
FIG. 8 is a flow chart illustrating the steps performed by the fiber orientation verification system.

Once the impregnating resin 50 has cured such as through application of thermal energy, the cured braided sleeve 38 and mandrel 46 are removed from the matched metal mold 48. The mandrel 46 is then removed in one piece by sliding it out from an open end of the formed spar 32 or through disassembly or melting of the mandrel as generally understood. FIG. 8 is a flow chart illustrating steps performed in the braided core manufacturing process.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotor blade assembly, comprising:
   a composite rotor blade spar having a tri-axial braid having a multiple of braided bias angled fibers and a multiple of zero degree fibers interwoven with said multiple of braided bias angled fibers which form a braided sleeve with an elongated cross-sectional profile which surrounds a longitudinal axis, said braided bias angled fibers oriented non-parallel to said longitudinal axis to provide two axes of said tri-axial braid,
   said zero degree fibers substantially parallel to said longitudinal axis to provide one axis of said tri-axial braid.

2. The assembly as recited in claim 1, wherein each of said braided bias angled fibers are offset approximately 40 degrees relative said longitudinal axis.

3. The assembly as recited in claim 1, wherein each of said braided bias angled fibers are offset approximately 45 degrees relative said longitudinal axis.

4. The assembly as recited in claim 1, wherein each of said braided bias angled fibers follow a spiral path around said longitudinal axis.

5. The assembly as recited in claim 1, wherein a leading edge and a trailing edge conic of said composite rotor blade spar comprise said braided bias angled fibers.

6. The assembly as recited in claim 1, wherein each of said braided bias angled fibers are oriented to accommodate a twist along said longitudinal axis.

7. The assembly as recited in claim 1, wherein said zero degree fibers are positioned adjacent an upper and lower aerodynamic surface of said composite rotor blade spar, said multiple of zero degree fibers maintained in tension.

8. The assembly as recited in claim 7, further comprising a separate composite sheet interwoven with said multiple of braided bias angled fibers and said multiple of zero degree fibers, said composite sheet located between said upper and lower aerodynamic surfaces.

9. The assembly as recited in claim 1, wherein said braided sleeve is formed to generally constrict toward said longitudinal axis.

10. The assembly as recited in claim 1, wherein said braided sleeve is resin impregnated.

11. The assembly as recited in claim 1, wherein said braided sleeve defines a race-track shaped elongated cross-sectional profile.

12. The assembly as recited in claim 1, wherein said braided sleeve defines an elliptical-shaped elongated cross-sectional profile.

13. The assembly as recited in claim 1, wherein said braided sleeve defines an airfoil-shaped elongated cross-sectional profile.

14. The assembly as recited in claim 1, wherein said braided sleeve is hollow.

15. A rotor blade assembly, comprising:
   a composite rotor blade spar having a multiple of braided bias angled fibers and a multiple of zero degree fibers interwoven with said multiple of braided bias angled fibers which form a braided sleeve with an elongated cross-sectional profile which surrounds a longitudinal axis, said braided bias angled fibers oriented non-parallel to said longitudinal axis, said zero degree fibers substantially parallel to said longitudinal axis.

16. The assembly as recited in claim 15, wherein said longitudinal axis is a faying axis.

17. The assembly as recited in claim 15, wherein each of said braided bias angled fibers follow a spiral path around said longitudinal axis.

18. The assembly as recited in claim 15, wherein a leading edge and a trailing edge conic of said spar comprise only said braided bias angled fibers.

19. The assembly as recited in claim 15, wherein each of said zero degree fibers are positioned adjacent an upper and lower surface of said spar.

20. The assembly as recited in claim 15, further comprising a separate composite sheet interwoven with said multiple of braided bias angled fibers and said multiple of zero degree fibers.

21. The assembly as recited in claim 15, wherein said braided sleeve is formed to generally constrict toward said longitudinal axis.

22. The assembly as recited in claim 15, wherein said multiple of zero degree fibers are maintained in tension.

23. The assembly as recited in claim 15, wherein said braided sleeve is resin impregnated.

24. A rotor blade assembly, comprising:
a composite rotor blade spar including a multiple of braided bias angled fibers and a multiple of zero degree fibers interwoven with said multiple of braided bias angled fibers which form a braided sleeve which surrounds a longitudinal axis, said multiple of braided bias angled fibers oriented non-parallel to said longitudinal axis, said multiple of zero degree fibers substantially parallel to said longitudinal axis;
an upper skin which defines an upper aerodynamic surface; and
a lower skin which defines a lower aerodynamic surface.

25. The assembly as recited in claim 24, wherein said zero degree fibers are positioned adjacent an upper surface and a lower surface of said spar and a separate composite sheet is interwoven with said multiple of braided bias angled fibers and said multiple of zero degree fibers between said upper and lower aerodynamic surfaces.

26. The assembly as recited in claim 24, wherein said upper skin and said lower skin are formed from a multitude of prepreg composite material plies.

27. The assembly as recited in claim 24, further comprising a leading-edge sheath which interconnects said upper skin and said lower skin forward of said spar relative said longitudinal axis.

28. The assembly as recited in claim 27, further comprising a counterweight between said leading-edge sheath and said spar.

* * * * *

UNITED STATES PATENT AND TRADEMARK OFFICE
CERTIFICATE OF CORRECTION

| | |
|---|---|
| PATENT NO. | : 7,165,945 B2 |
| APPLICATION NO. | : 10/646310 |
| DATED | : January 23, 2007 |
| INVENTOR(S) | : Kovalsky et al. |

It is certified that error appears in the above-identified patent and that said Letters Patent is hereby corrected as shown below:

ON THE TITLE PAGE

ITEM (*): Delete "This patent is subject to a terminal disclaimer."

Signed and Sealed this

Tenth Day of April, 2007

JON W. DUDAS
*Director of the United States Patent and Trademark Office*